(12) United States Patent
Schroeder et al.

(10) Patent No.: US 12,129,807 B2
(45) Date of Patent: Oct. 29, 2024

(54) DUAL FUEL ENGINE OPERATING STRATEGY FOR OPTIMIZED HYDROGEN AND HYDROCARBON FUELING

(71) Applicant: Caterpillar Inc., Peoria, IL (US)

(72) Inventors: Eric Lee Schroeder, Germantown Hills, IL (US); Michael Todd Graziano, Jr., Washington, IL (US); Jaswinder Singh, Dunlap, IL (US); David Todd Montgomery, Edelstein, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/737,528

(22) Filed: May 5, 2022

(65) Prior Publication Data

US 2023/0358186 A1 Nov. 9, 2023

(51) Int. Cl.
*F02D 41/00* (2006.01)
*F02D 19/06* (2006.01)
(Continued)

(52) U.S. Cl.
CPC ..... *F02D 41/0027* (2013.01); *F02D 19/0644* (2013.01); *F02D 19/081* (2013.01); *F02D 41/1452* (2013.01); *F02D 41/1406* (2013.01)

(58) Field of Classification Search
CPC ............... F02D 19/024; F02D 19/0644; F02D 19/0647; F02D 19/08; F02D 19/081;
(Continued)

(56) References Cited

U.S. PATENT DOCUMENTS 5,787,864 A   8/1998   Collier, Jr. et al.
6,820,706 B2  11/2004  Ovshinsky et al.
(Continued)

FOREIGN PATENT DOCUMENTS

CN   108625998 B   9/2020
CN   112983655 A   6/2021
(Continued)

OTHER PUBLICATIONS

Written Opinion and International Search Report for Int'l. Patent Appln. No. PCT/US2023/063312, mailed Jul. 4, 2023 (12 pgs).

*Primary Examiner* — John M Zaleskas
(74) *Attorney, Agent, or Firm* — Brannon Sowers & Cracraft PC

(57) ABSTRACT

Operating an engine system includes combusting a gaseous hydrogen fuel (H2) and a gaseous hydrocarbon fuel (HC) at a first substitution ratio in a cylinder in an engine, determining at least one of an H2 fueling command or an HC fueling command based on an H2 availability input and an H2 cost, and outputting the H2 fueling command and the HC fueling command to an H2 injector and an HC admission valve, respectively. Operating the engine system further includes combusting H2 and HC at a varied substitution ratio based on the H2 fueling command and the HC fueling command. At least one of the H2 fueling command or the HC fueling command may be based on a monitored CO2 exhaust level which may be used to populate a stored history of CO2 output.

20 Claims, 2 Drawing Sheets

(51) Int. Cl.
*F02D 19/08* (2006.01)
*F02D 41/14* (2006.01)

(58) Field of Classification Search
CPC ............. F02D 21/0209; F02D 21/0212; F02D 21/0215; F02D 41/0025; F02D 41/0027; F02D 41/1452; F02D 2043/106; F02M 25/12

See application file for complete search history.

(56) References Cited

U.S. PATENT DOCUMENTS

| | | | |
|---|---|---|---|
| 7,497,191 B2 | 3/2009 | Fulton et al. | |
| 7,937,948 B2 | 5/2011 | Zubrin et al. | |
| 8,075,869 B2 | 12/2011 | Zhu et al. | |
| 8,800,529 B2 | 8/2014 | Wickstone et al. | |
| 9,388,749 B2 | 7/2016 | MacDonald | |
| 10,145,319 B1* | 12/2018 | Engfehr | F02D 19/105 |
| 10,883,419 B2 | 1/2021 | Alexander et al. | |
| 10,927,773 B2 | 2/2021 | Gieger | |
| 11,174,800 B2 | 11/2021 | Wang et al. | |
| 11,614,040 B1* | 3/2023 | Bickett | F02D 19/0644 |
| | | | 701/108 |
| 2002/0185086 A1* | 12/2002 | Newman | F02D 19/081 |
| | | | 123/576 |
| 2005/0229872 A1* | 10/2005 | Lange | F02D 19/081 |
| | | | 123/585 |
| 2006/0263283 A1* | 11/2006 | Egan | B01F 23/19 |
| | | | 423/210 |
| 2006/0283423 A1* | 12/2006 | Ito | F02D 19/0634 |
| | | | 123/406.45 |
| 2007/0107703 A1* | 5/2007 | Natkin | F02B 37/00 |
| | | | 123/527 |
| 2008/0263955 A1 | 10/2008 | Lynch et al. | |
| 2009/0050383 A1* | 2/2009 | Brigham | B60L 53/14 |
| | | | 701/22 |
| 2009/0055304 A1* | 2/2009 | Lange | G06Q 40/00 |
| | | | 705/37 |
| 2009/0120385 A1* | 5/2009 | Munshi | F02D 19/024 |
| | | | 123/3 |
| 2009/0320789 A1* | 12/2009 | Lund | F02D 19/0644 |
| | | | 123/299 |
| 2011/0010075 A1* | 1/2011 | Rogers | F02D 19/081 |
| | | | 73/114.42 |
| 2011/0036310 A1* | 2/2011 | Ichikawa | F02M 25/12 |
| | | | 123/3 |
| 2011/0174267 A1* | 7/2011 | Surnilla | F02D 35/027 |
| | | | 123/406.29 |
| 2011/0174268 A1* | 7/2011 | Surnilla | F02P 5/1527 |
| | | | 123/90.15 |
| 2011/0288738 A1* | 11/2011 | Donnelly | F02D 19/0647 |
| | | | 701/99 |
| 2012/0160221 A1* | 6/2012 | Munshi | F02M 21/0206 |
| | | | 123/575 |
| 2013/0158752 A1* | 6/2013 | Norton | F02D 19/0647 |
| | | | 701/19 |
| 2013/0158848 A1* | 6/2013 | Gallagher | F02D 29/02 |
| | | | 701/123 |
| 2014/0222317 A1* | 8/2014 | Norton | F02D 19/081 |
| | | | 701/104 |
| 2014/0366839 A1* | 12/2014 | Sivasubramanian | F02D 19/105 |
| | | | 123/352 |
| 2014/0366840 A1* | 12/2014 | Sivasubramanian | F02D 19/081 |
| | | | 123/399 |
| 2015/0101566 A1* | 4/2015 | Leone | F02D 19/081 |
| | | | 123/304 |
| 2015/0114351 A1* | 4/2015 | Lund | F02D 19/0684 |
| | | | 123/457 |
| 2015/0226140 A1* | 8/2015 | Zhang | H02J 7/007 |
| | | | 123/495 |
| 2015/0275781 A1 | 10/2015 | Matar et al. | |
| 2015/0322904 A1* | 11/2015 | Leone | F02M 26/43 |
| | | | 701/104 |
| 2015/0377153 A1* | 12/2015 | Gallagher | F02D 41/0027 |
| | | | 123/575 |
| 2016/0208749 A1* | 7/2016 | Sivasubramanian | F02D 41/0027 |
| 2016/0222895 A1* | 8/2016 | Norton | F02D 41/0025 |
| 2016/0258379 A1* | 9/2016 | Rasmussen | F02D 19/0642 |
| 2016/0327464 A1* | 11/2016 | Rasmussen | F02B 43/00 |
| 2017/0037795 A1* | 2/2017 | Galindo | F02D 41/0027 |
| 2017/0074201 A1* | 3/2017 | Sujan | F02M 26/06 |
| 2017/0122195 A1* | 5/2017 | Crema | F01N 5/04 |
| 2017/0320498 A1* | 11/2017 | Miller | B60W 10/06 |
| 2019/0145327 A1* | 5/2019 | Gieger | F02D 41/0027 |
| | | | 123/472 |
| 2019/0293004 A1 | 9/2019 | Gallagher et al. | |
| 2020/0003137 A1* | 1/2020 | Pedder | F02D 19/081 |
| 2021/0087981 A1* | 3/2021 | Wang | F02D 41/0027 |
| 2021/0310430 A1* | 10/2021 | Fisher | F02D 19/025 |
| 2022/0025826 A1* | 1/2022 | Gallagher | F02D 25/00 |
| 2022/0065181 A1* | 3/2022 | Norton | F02D 19/081 |
| 2022/0097817 A1* | 3/2022 | Perry | F02D 19/0647 |

FOREIGN PATENT DOCUMENTS

| | | |
|---|---|---|
| KR | 20170089458 A | 8/2017 |
| KR | 20200007444 | 1/2020 |
| WO | WO-2022109633 A1 * | 6/2022 |

* cited by examiner

DUAL FUEL ENGINE OPERATING STRATEGY FOR OPTIMIZED HYDROGEN AND HYDROCARBON FUELING

STATEMENT OF GOVERNMENT INTEREST

This invention was made with government support under contract DE-EE0009422 awarded by DOE. The Government has certain rights in this invention.

TECHNICAL FIELD

The present disclosure relates generally to operating an internal combustion engine on gaseous hydrogen and gaseous hydrocarbon fuels, and more particularly to operating the engine at a substitution ratio of hydrogen to hydrocarbon that is based on hydrogen availability and cost.

BACKGROUND

Internal combustion engines are well-known and widely used globally for purposes ranging from vehicle propulsion to operation of pumps and compressors, and for electrical power generation. In the oil and gas industry, for example, internal combustion engines are indispensable for providing power for gas compression, conveyance of fluids, and electrical power generation. Internal combustion engine design and operation is undergoing a revolution as investors, markets, and various stakeholders increasingly look to producers, manufacturers, and service providers to limit certain emissions produced by internal combustion engines in the field. Carbon emissions associated with various operations in particular are increasingly scrutinized, and planning strategies to reduce carbon emissions are well underway.

Adoption of hydrogen as a fuel source for traditional hydrocarbon-based engine platforms offers promise for reduction in certain emissions, notably carbon. Employing gaseous hydrogen fuel in traditional reciprocating internal combustion engines offers significant advantages over efforts to convert to electrically powered equipment or other complex solutions. Adopting gaseous hydrogen fuel as a practical alternative or supplement to traditional hydrocarbon-based fuels, however, provides a many different engineering and technical challenges. Recently, manufacturers have begun to explore strategies for operating traditional reciprocating engines on hydrogen or hydrogen-enriched fuels. One arrangement utilizes an internal combustion engine designed to operate on gaseous hydrocarbon fuel such as methane or natural gas that is supplemented with gaseous hydrogen. Due to factors such as uncertain availability of hydrogen and challenges in adapting internal electronic controls to optimally operate an engine on flexible fuel types, strategies for blending hydrogen and hydrocarbon fuels have yet to realize their full theoretical potential. U.S. patent application Ser. No. 17/552,717 is directed to a cost-based substitution ratio control in a hydrogen-capable internal combustion engine system.

SUMMARY

In one aspect, a method of operating an internal combustion engine system includes combusting a gaseous hydrogen fuel (H2) and a gaseous hydrocarbon fuel (HC) at a first substitution ratio in a cylinder in an engine, receiving an H2 availability input, and determining at least one of an H2 fueling command or an HC fueling command based on the H2 availability input and an H2 cost. The method further includes outputting the H2 fueling command and the HC fueling command to an H2 injector and an HC admission valve, respectively, each coupled to an intake system for the engine, and combusting H2 and HC at a varied substitution ratio in the cylinder that is based on the H2 fueling command and the HC fueling command.

In another aspect, an internal combustion engine system includes an engine having a plurality of cylinders formed therein, and a plurality of pistons each reciprocable in one of the plurality of cylinders. The engine system further includes a gaseous hydrogen fuel (H2) injector, and a gaseous hydrocarbon fuel (HC) admission valve. The engine system further includes an intake system structured to convey a mixture containing the H2, the HC, and air, to the plurality of cylinders, and a fueling control system. The fueling control system includes at least one electronic control unit, in control communication with the H2 injector and the HC admission valve. The at least one electronic control unit is structured to determine at least one of an H2 fueling command or an HC fueling command based on the H2 cost and at least one of, a feed rate or a storage amount of H2. The at least one electronic control unit is further structured to output the H2 fueling command and the HC fueling command to the H2 injector and the HC admission valve, respectively, to vary a substitution ratio of H2 to HC combusted in the plurality of cylinders.

In still another aspect, a fueling control system for a dual gaseous hydrogen fuel (H2) and gaseous hydrocarbon fuel (HC) engine includes at least one electronic control unit structured to receive an H2 availability input indicative of at least one of an H2 feed rate or an H2 storage amount, and to receive an H2 cost input indicative of an H2 cost. The at least one electronic control unit is further structured to determine each of an H2 fueling command and an HC fueling command based on the H2 availability input and the H2 cost input, and to output the H2 fueling command and the HC fueling command to an H2 injector and an HC admission valve, respectively. The at least one electronic control unit is still further structured to vary a substitution ratio of H2 to HC combusted in a plurality of cylinders in the engine based on the H2 fueling command and the HC fueling command.

DETAILED DESCRIPTION

Figure 1:
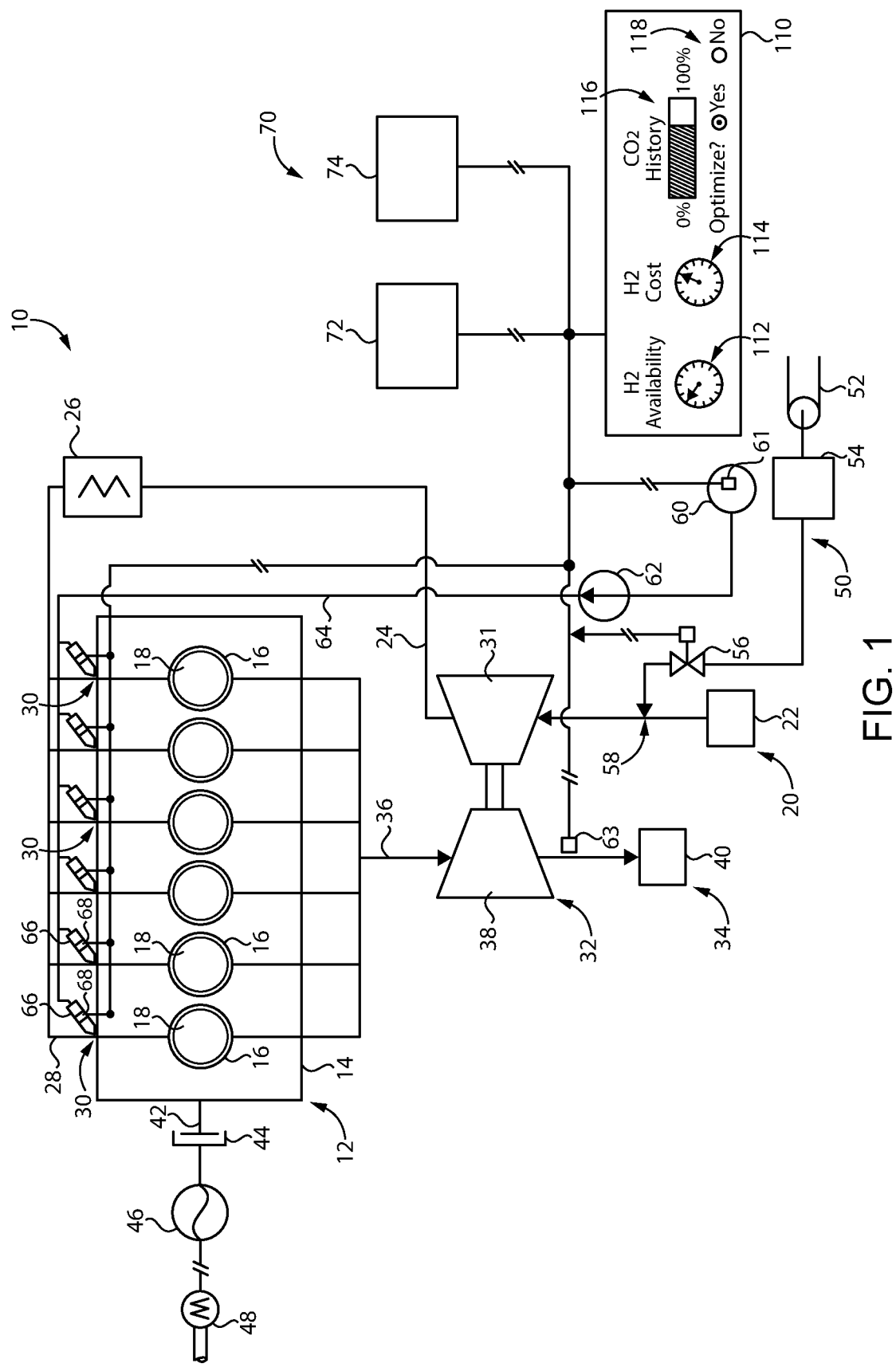
FIG. 1 is a diagrammatic view of an internal combustion engine system, according to one embodiment.

Referring to FIG. 1, there is shown a dual fuel internal combustion engine system 10, according to one embodiment. Engine system 10 includes an engine having an engine housing 14 with a plurality of combustion cylinders 16 formed therein, and a plurality of pistons 18 each reciprocable in one of cylinders 16. Engine 12 can include any number of cylinders in any suitable arrangement, such as an in-line pattern, a V-pattern, or still another. Engine 12 is coupled to a driveshaft 42 rotatable to power a load 46 by way of a clutch 44 and potentially a transmission (not shown). In one implementation, load 46 includes an electrical generator that provides electrical power to operate an electrically powered device such as an electric motor 48 or to supply an electrical grid. Engine 12 can be applied to produce rotational power for an electrical generator as shown, a pump, a compressor, a driveline in a mobile vehicle such as a truck or a marine vessel, or for virtually any other conceivable purpose. In a typical configuration engine 12 is spark-ignited, and each cylinder 16 may be equipped with spark ignition devices such as prechamber sparkplugs (not shown).

Engine system 10 also includes an intake system 20 having an air inlet 22, and an intake conduit 24 extending to an intake manifold 28. Intake air flows from air inlet 22 through a compressor 31 in a turbocharger 32, and into intake manifold 28 by way of an aftercooler 26. A suction side of compressor 31 refers to locations in intake system 20 fluidly between compressor 31 and air inlet 22, and a pressure side of compressor 31 refers to locations in intake system 20 fluidly between compressor 31 and cylinders 16. A plurality of intake ports 30 are formed in engine housing 14 fluidly between intake manifold 28 and cylinders 16. Engine system 10 also includes an exhaust system 34 having an exhaust conduit 36 extending, such as by way of an exhaust manifold (not numbered), to a turbine 38 in turbocharger 32, and thenceforth to an exhaust outlet 40 such as an exhaust stack or tailpipe. As further discussed herein intake system 20 is structured to convey a mixture containing a gaseous hydrogen fuel (H2), a gaseous hydrocarbon fuel (HC), and compressed air to cylinders 16. Exhaust system 34 is structured to convey exhaust from combustion of the H2, the HC, and air to exhaust outlet 40.

Engine system 10 further includes a fuel system 50 including an HC supply 52. In an implementation HC supply 52 can include a line gas HC supply such as might be available at a wellhead, a mine, or other site where a supply of gaseous HC, such as natural gas, methane, ethane, biogas, blends, etc., is expected to be continuously or at least predictably available. In other implementations HC supply 52 could include a compressed gaseous HC supply, a cryogenically stored liquified gaseous HC supply coupled with a vaporizer, or another supply capable of producing or providing HC. A filter or other treatment apparatus 54 may be positioned fluidly between HC supply 52 and an HC port 58 connecting to intake conduit 24 on a suction side of compressor 31, enabling HC to be supplied to engine 12 by way of fumigation as will be familiar to those skilled in the art. An HC admission valve 56 which may be electrically actuated is positioned fluidly between HC supply 52 and HC port 58.

Fuel system 50 further includes an H2 supply 60. In one implementation H2 supply 60 includes a pressurized storage tank or the like containing gaseous molecular hydrogen or a hydrogen-enriched gaseous fuel blend. The H2 may be supplied to H2 supply 60 from any of a variety of sources. For example, a chemical plant might produce hydrogen as a byproduct of a manufacturing process, with the hydrogen produced being collected and pressurized for storage in H2 supply 60. Other H2 sources could include a hydrogen reformer or equipment for collecting H2 from various fluid mixtures. In still other instances engine system 10 could be connected to a hydrogen pipeline.

In any case, availability of hydrogen, including availability of so-called "green" hydrogen from renewable sources, may be limited due to a combination of fuel availability and distribution challenges brought about by limited hydrogen infrastructure. An operator's needs may not always align with an available supply of hydrogen, for example, because an industrial source produces hydrogen at a variable or unpredictable level, or because there may be limitations or unpredictability as to an instantaneous flow rate of hydrogen that an operator can consume, a limitation on a total daily consumption of hydrogen, or financial limitations related to H2 cost, availability, storage, and/or demand. For these and other reasons an operator such an electrical power producer may utilize HC, at least at times, as the sole fuel or blended with H2 to ensure that needs can be consistently and reliably satisfied. At the same time an operator may wish to minimize or optimize an emissions footprint of an engine system, such as a greenhouse gas (GHG) footprint, while still meeting power or heat requirements. As will be further apparent from the following description, selectively switching a generator set or other operations to HC or HC and H2 blends may be desirable and is provided according to the present disclosure.

Fuel system 50 further includes a pump 62 positioned fluidly between H2 supply 60 and a plurality of H2 injectors 66 to pressurize H2 to a pressure higher than a boost pressure and feed the same through an H2 supply conduit 64 to engine 12. In an implementation H2 injectors 66 includes port injectors each located at or close to intake ports 30. In other implementations one or more H2 injectors could be positioned to inject H2 into intake manifold 28, for example, or potentially configured as direct injectors to inject H2 into cylinders 16.

Engine system 10 further includes a fueling control system 70. Fueling control system 70 includes at least one electronic control unit, in control communication with H2 injectors 66 and with H2 admission valve 56. In one implementation the at least one electronic control unit includes a fueling control unit 72 and a supervisory control unit 74. It will be appreciated that the functionality of fuel system control, and in particular control of a substitution ratio of H2 to HC as further described herein, could be performed by a single electronic control unit, two electronic control units, or more than two electronic control units. Accordingly, description and discussion herein of features or functionality of any one electronic control unit should be understood to refer by way of analogy to features or functionality of any other electronic control unit in fueling control system 70. An electronic control unit as contemplated herein includes any suitable programmable logic unit such as a microprocessor or a microcontroller.

Fueling control system 70 may also include an operator input interface 110 in communication with one or both of electronic control units 72 and 74. Operator input interface 110 could include a graphical input interface, a keyboard, a mouse, or combinations or extensions of these. Operator input interface 110 could be part of a service tool in some embodiments. In the illustrated example operator input interface 110 includes an H2 availability control 112, an H2 cost control 114, a CO2 history indicator 116, and an Optimize? control 118. Each of controls 112, 114, and 118 could include one or more buttons, dials, switches, graphical buttons, icons, or sliders, for example, on a display, or some other suitable structure for inputting information from and/or displaying information to an operator such as a service technician.

Fueling control system 70 may also include an H2 sensor 61 in or associated with H2 supply 60 and structured to produce data indicative of at least one of, a feed rate or a storage amount of H2. Fueling control system 70 may also include a CO2 sensor 63 coupled with exhaust system 34 and structured to produce data for monitoring a CO2 exhaust level of engine 12 directly or indirectly. H2 sensor 61 could include a pressure sensor, a flow sensor, or both, for example. CO2 sensor 63 could include a sensor responsive to an actual CO2 exhaust level, or a sensor such as an oxygen or lambda sensor monitoring other exhaust constituents to indirectly indicate an approximate level of CO2 in exhaust from engine 12. Fueling control system 70 could also include or be coupled with various other sensors such as a boost pressure sensor, a cylinder pressure sensor, an engine speed sensor, engine and/or exhaust temperature sensors, a virtual engine load sensor, and various other sensors and sensor groups, virtual or not virtual, that are considered conventional and not specifically illustrated herein.

The at least one electronic control unit 72, 74 is in control communication with H2 injector 66 and HC admission valve 56 as noted above, and structured to determine at least one of an H2 fueling command or an HC fueling command based on an H2 cost and at least one of, a feed rate or a storage amount of H2. Data indicative of the at least one of, a feed rate or a storage amount of H2, can be understood as H2 availability, and may be provided by way of an input from H2 sensor 61. An H2 availability input to the at least one electronic control unit 72, 74 could also be produced by H2 availability control 112 in operator input interface 110. The at least one electronic control unit 72, 74 is further structured to output the H2 fueling command and the HC fueling command to H2 injector 66 and HC admission valve 56, respectively, to establish or vary a substitution ratio of H2 to HC combusted in cylinder 66.

Figure 2:
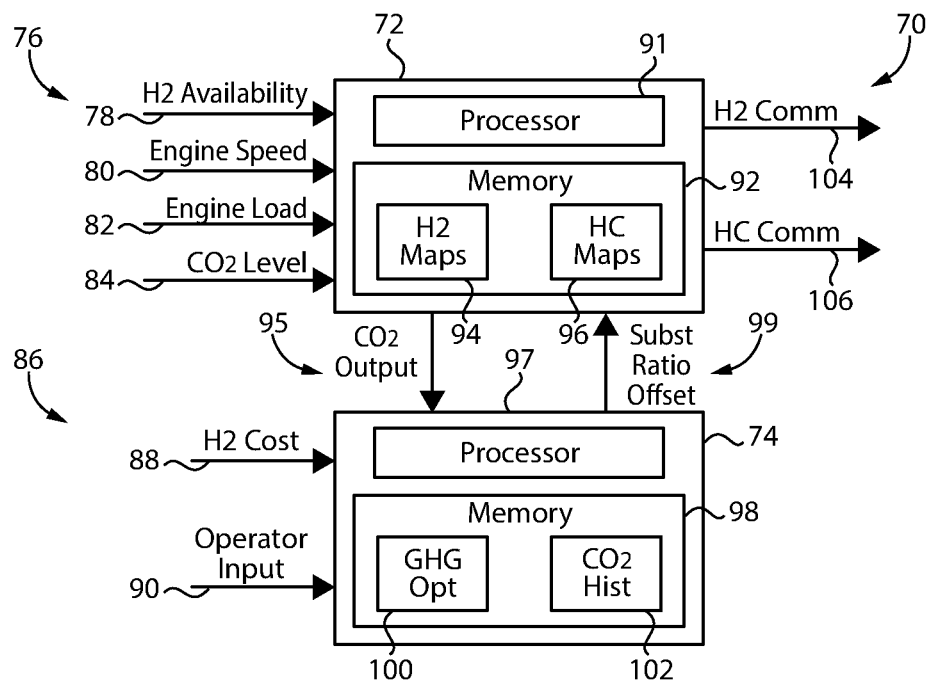
FIG. 2 is a functional block diagram of a fueling control system, according to one embodiment.

Referring also now to FIG. 2, there is shown a functional block diagram of fueling control system 70. Fueling control unit 72 includes a processor 91 and a computer readable memory 92 storing H2 maps 94 and HC maps 96 in the illustrated example. H2 maps 94 and HC maps 96 may include fueling maps for determining fueling control commands as well as ignition maps for determining ignition (spark) timing. Fueling control unit 72 may interpolate between H2 maps 94 and HC maps 96 to determine ignition timings based on relative proportions of H2 and HC combusted in a given engine cycle in at least some embodiments. Supervisory control unit 74 includes a processor 97 and a computer readable memory 98 storing greenhouse gas (GHG) optimization instructions or software 100 and also a stored CO2 history 102 populated by supervisory control unit 74. Computer readable memories 92 and 98 could include any suitable volatile or non-volatile memory, such as RAM, ROM, DRAM, SDRAM, EPROM, FLASH, or still another. It will be recalled the illustrated features and functionality of fueling control unit 72 and supervisory control unit 74 might be integrated into a single electronic control unit, or more than two electronic control units, or might be structured differently than that illustrated.

Also depicted in FIG. 2 are fueling determination inputs 76 received by fueling control unit 72. Fueling determination inputs 76 include an H2 availability input 78, such as might be produced by H2 sensor 61 or H2 availability control 112, that is indicative of at least one of, the feed rate or storage amount of H2. Thus, the fueling determination input might be "X" liters or moles of H2 per minute or hour, "Z" total liters or moles of H2 available, or some other quantitative term. Fueling determination inputs 76 may also include an engine speed input 80, an engine load input 82, and a CO2 level input 84, such as might be produced by or derived from outputs of CO2 sensor 63. Fueling control unit 72 outputs an H2 fueling command 104 and an HC fueling command 106 to H2 injectors 66 and HC admission valve 56, respectively, as discussed herein. H2 fueling command 104 and HC fueling command 106, for example electrical control current commands to solenoids in the respective apparatuses, can be used to set or adjust a substitution ratio of the mixture of H2, HC, and air that is combusted in cylinders 16.

Also depicted in FIG. 2 are optimization inputs 86 received by supervisory control unit 74, including an H2 cost input such as might be produced by H2 cost control 114 or received from H2 sensor 61, and an operator request signal for H2/HC optimization 90, such as might be produced by Optimize? control 118. H2 cost input might be "Z" dollars per liter or mole of H2, or a dimensionless numerical cost indicator, for example. Communicated between fueling control unit 72 and supervisory control unit 74 are a CO2 output 94, transmitted from fueling control unit 72 to supervisory control unit 74, and a substitution ratio offset 99 transmitted from supervisory control unit 74 to fueling control unit 72. CO2 output 94 may be an instantaneous CO2 level such as parts per million (ppm), for instance, or a CO2 level averaged over a time duration.

Substitution ratio offset 99 may include a numerical offset that varies a substitution ratio of H2 to HC that would otherwise be yielded by determining H2 fueling command 104 and HC fueling command 106 where operator input 90 is not received. For instance, based on a given H2 availability and a given H2 cost fueling control unit 72 might determine fueling control commands 104 and 106 to yield an H2 to HC substitution ratio of "Y"% H2. Substitution ratio offset 99 could be applied to yield an H2 to HC substitution ratio of 0.9Y %, 1.1Y %, and so on, as further discussed herein.

As explained above, H2 availability can be limited or potentially variable and unpredictable. In some instances, it will be desirable to operate engine system 10 with as high an H2 to HC substitution ratio as is practicable, in other words based on a max availability of H2. An operator may be cognizant of H2 cost as well as a GHG footprint at least at times, however. Fueling control system 70 can balance these factors enabling an operator to optimize engine system operation to best achieve several goals.

In general, where H2 cost is relatively lower it may be desirable to supply H2 at the max available flow rate, thus providing a relatively higher H2 to HC substitution ratio. Where H2 cost is relatively higher it may be desirable to supply H2 at less than a maximum flow rate than could theoretically be achieved, or not at all. Where H2/CO2 is to be optimized, however, a desire to limit or otherwise manage CO2 output may influence and, at times, supersede or override H2 cost considerations. Operator input 90 can be understood as an operator request to optimize H2/CO2. Where operator input 90 is received, at least one and typically both of fueling control commands 104 and 106 may be determined based on both H2 availability and CO2 level, typically including a stored history of CO2 output over time (a "GHG footprint"), and potentially also the H2 cost. Where H2 cost is relatively lower, optimizing H2/CO2 could be effected by determining fueling control commands 104 and 106 to provide the highest H2 to HC substitution ratio practicable based on H2 availability regardless of the GHG footprint. Where H2 cost is not low then optimizing H2/CO2 could be effected by determining fueling control commands 104 and 106 to provide the H2 to HC substitution ratio on a sliding scale based on the GHG footprint. For instance, if H2 cost is moderately high and the GHG footprint indicates greater than "Q"% of an annual CO2 output target has already been reached, then the fueling control commands could be determined to provide an H2 to HC substitution ratio that is less, to a first relative extent, than the highest H2 to HC substitution ratio practicable. When H2 cost is very high and the GHG footprint indicates greater than Q % of an annual CO2 output target has already been reached, then the fueling control commands could be determined to provide an H2 to HC substitution ratio that is less, to a greater relative extent, than the highest H2 to HC substitution ratio practicable. As suggested above, in some instances H2 cost might not be factored in at all. Supervisory control unit 74 may further include suitable maps relating GHG footprint, H2 cost, a substitution ratio offset, and potentially other factors, or could perform calculations to determine a relative adjustment to H2 to HC substitution ratio as contemplated herein. In view of the present description those skilled in the art will appreciate other strategies for balancing H2 cost with CO2 level based on a stored CO2 history or other still other factors.

In one practical implementation, the at least one fueling control unit 72, 74 determines H2 command 104 and HC command 106 on the basis of a portion of engine power output to be created by each fuel. In particular, fueling control unit 72 might determine, based on lower heating values of each fuel, required fuel flow rates, and then establish the fuel flow rates of H2 and HC via the respective H2 command 104 and HC command 106. An engine speed governor resident, for example, on fueling control unit 72 or supervisory control unit 74, can also account for a difference in transport delay of each of the respective fuels. In other words, since some time may be required to increase or decrease a fuel flow rate of H2 and/or HC, when an adjustment is to be made the speed of a loop calculation or other determination of at least one of the respective fueling commands can account for the fact that fueling rate adjustments may not take place instantaneously by slowing or delaying the determination.

INDUSTRIAL APPLICABILITY

Figure 3:
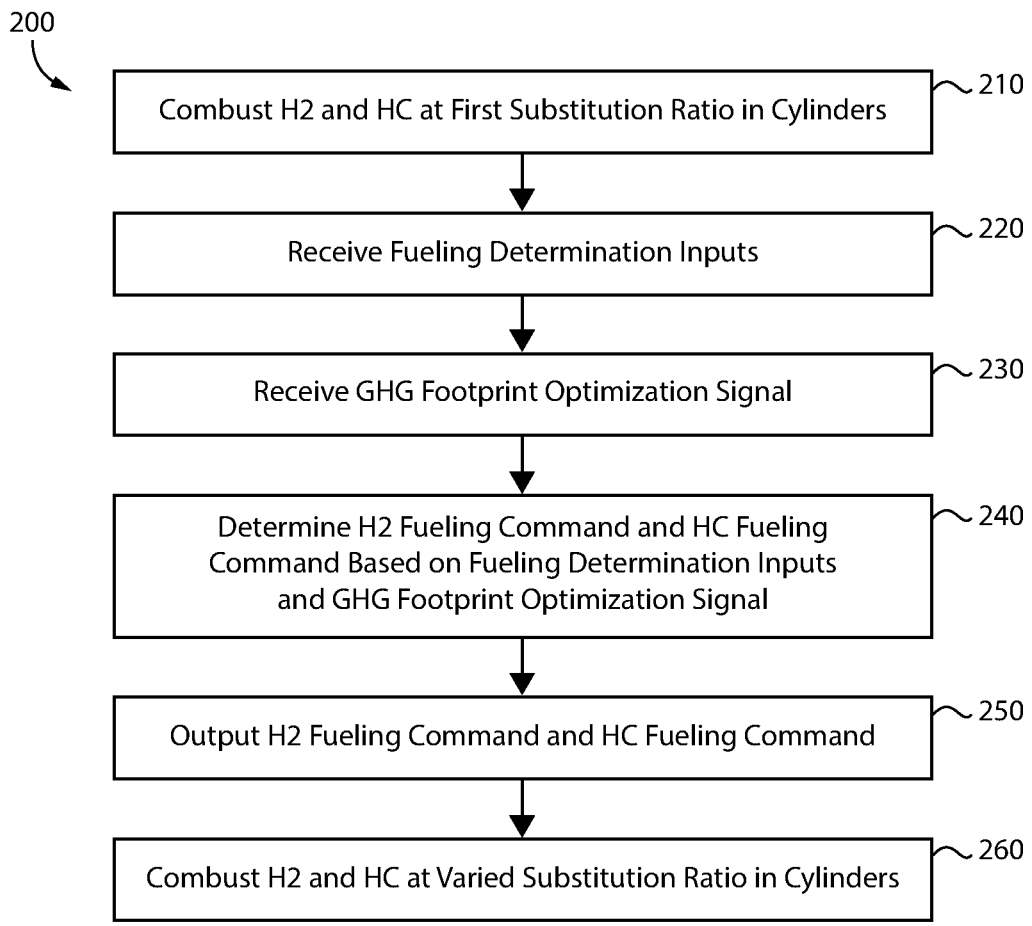
FIG. 3 is a flowchart illustrating example methodology and logic flow, according to one embodiment.

Referring to the drawings generally, but also now to FIG. 3, there is shown a flowchart 200 illustrating example methodology and logic flow, according to one embodiment. At a block 210, H2 and HC are combusted at a first substitution ratio in cylinders 16. From block 210 flowchart 200 advances to a block 220 to receive fueling determination inputs 76. It will be recalled fueling determination inputs 76 can include an H2 availability input 78. H2 availability can be determined from a direct sensor, such as H2 sensor 61, but could otherwise be determined by way of H2 availability control 112 and directly inputted by an operator.

From block 220 flowchart 200 advances to a block 230 to receive a GHG footprint optimization signal (operator input 90). It will also be recalled supervisory control unit 74 can communicate substitution ratio offset 99 to fueling control unit 72. Where no GHG footprint optimization signal is received, or potentially where H2 cost is high and overall GHG footprint is low, for example, no offset or a 0% offset might be employed.

From block 230 flowchart 200 advances to a block 240 to determine H2 command 104 and HC command 106 based on the H2 availability and other factors discussed herein, including any substitution ratio offset that is to be used. From block 250 flowchart 200 may advance to a block 260 to combust H2 and HC at a varied substitution ratio in cylinders 16 that is based on H2 command 104 and HC command 106.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of operating an internal combustion engine system comprising:
   combusting a gaseous hydrogen fuel (H2) and a gaseous hydrocarbon fuel (HC) at a first substitution ratio in a cylinder in an engine;
   receiving an H2 availability input;
   determining at least one of an H2 fueling command or an HC fueling command based on the H2 availability input and a history of CO2 output of the engine, wherein the history of CO2 output of the engine is indicative of a relative proportion of a CO2 output target reached that is less than the CO2 output target and cumulative of CO2 output of the engine over a time duration;
   outputting the H2 fueling command and the HC fueling command to an H2 injector and an HC admission valve, respectively, each coupled to an intake system for the engine; and
   combusting H2 and HC at a varied substitution ratio in the cylinder that is based on the H2 fueling command and the HC fueling command and less than a highest H2 to HC substitution ratio, for combustion of both H2 and HC in the cylinder, that is based on an H2 availability indicated by the H2 availability input.

2. The method of claim 1 further comprising monitoring a CO2 exhaust level of the engine, and wherein the determining at least one of the H2 fueling command or the HC fueling command is based on the monitored CO2 exhaust level.

3. The method of claim 2 wherein the history of CO2 output includes a stored history, and further comprising populating the stored history of CO2 output based on the monitoring the CO2 exhaust level of the engine.

4. The method of claim 3 further comprising receiving an operator request for H2/CO2 optimization, and wherein the determining at least one of the H2 fueling command or the HC fueling command is based on the operator request for H2/CO2 optimization.

5. The method of claim 1 wherein the HC admission valve is fluidly connected to the intake system upon a suction side of a compressor of a turbocharger.

6. The method of claim 5 wherein the H2 injector includes an H2 port injector.

7. The method of claim 1 wherein the determining at least one of the H2 fueling command or the HC fueling command further includes:
   determining each of the H2 fueling command and the HC fueling command based on the H2 availability input, the history of CO2 output, and an H2 cost; and
   establishing fuel flow rates of the H2 and the HC via the respective H2 fueling command and HC fueling command based on lower heating values of H2 and HC, respectively.

8. The method of claim 1 wherein the H2 availability input is indicative of at least one of an H2 feed rate or an H2 storage amount.

9. An internal combustion engine system comprising:
   an engine having a plurality of cylinders formed therein, and a plurality of pistons each reciprocable in one of the plurality of cylinders;
   a gaseous hydrogen fuel (H2) injector;
   a gaseous hydrocarbon fuel (HC) admission valve;
   an intake system structured to convey a mixture containing the H2, the HC, and air, to the plurality of cylinders;
   a fueling control system including at least one electronic control unit, in control communication with the H2 injector and the HC admission valve, and structured to:
   determine at least one of an H2 fueling command or an HC fueling command based on at least one of a feed rate of H2 or a storage amount of H2, and a history of CO2 output of the engine indicative of a relative proportion of a CO2 output target reached that is less than the CO2 output target and cumulative of CO2 output of the engine over a time duration;
   output the H2 fueling command and the HC fueling command to the H2 injector and the HC admission valve, respectively, to vary a substitution ratio of H2 to HC combusted in the plurality of cylinders; and
   limit the substitution ratio of H2 to HC combusted in the plurality of cylinders based on the history of CO2 output of the engine.

10. The internal combustion engine system of claim 9 wherein the at least one electronic control unit is further structured to receive an H2 availability input indicative of the at least one of the feed rate of H2 or the storage amount of H2.

11. The internal combustion engine system of claim 10 wherein the at least one electronic control unit is further structured to determine the at least one of the H2 fueling command or the HC fueling command based on a CO2 exhaust level of the engine.

12. The internal combustion engine system of claim 11 further comprising a computer readable memory storing the history of CO2 output of the engine.

13. The internal combustion engine system of claim 12 further comprising an operator input interface, and wherein the at least one electronic control unit is further structured to receive an operator request for H2/CO2 optimization from the operator input interface, and to determine the at least one of the H2 fueling command or the HC fueling command based on the operator request for H2/CO2 optimization.

14. The internal combustion engine system of claim 10 wherein the H2 availability input is indicative of a max H2 availability.

15. The internal combustion engine system of claim 14 wherein the at least one electronic control unit is further structured to limit the H2 to HC substitution ratio based on an H2 cost.

16. The internal combustion engine system of claim 9 wherein the intake system further includes a turbocharger compressor, and the HC admission valve is fluidly connected to the intake system upon a suction side of the turbocharger compressor, and wherein the H2 injector includes an H2 port injector.

17. The internal combustion engine system of claim 16 wherein the at least one electronic control unit is further structured to determine each of the H2 fueling command and the HC fueling command to establish fuel flow rates into the intake system based on lower heating values of H2 and HC, respectively.

18. A fueling control system for a dual gaseous hydrogen fuel (H2) and gaseous hydrocarbon fuel (HC) engine comprising:
   at least one electronic control unit structured to:
   receive an H2 availability input indicative of at least one of an H2 feed rate or an H2 storage amount;
   receive an H2 cost input indicative of an H2 cost;
   determine each of an H2 fueling command and an HC fueling command based on the H2 availability input, the H2 cost input and a history of CO2 output of the engine over a time duration, wherein the history of CO2 output of the engine is indicative of a relative proportion of a CO2 output target reached that is less than the CO2 output target and cumulative of CO2 output of the engine over a time duration;
   output the H2 fueling command and the HC fueling command to an H2 injector and an HC admission valve, respectively;
   vary a substitution ratio of H2 to HC combusted in a plurality of cylinders in the engine based on the H2 fueling command and the HC fueling command; and
   limit the substitution ratio of H2 to HC below a highest available H2 to HC substitution ratio for combustion of both H2 and HC in the plurality of cylinders, based on the history of CO2 output over the time duration.

19. The fueling control system of claim 18 wherein the H2 availability input is indicative of a max H2 availability, and the at least one electronic control unit is further structured to limit the substitution ratio based on the H2 cost.

20. The fueling control system of claim 19 further comprising an exhaust sensor structured to monitor a CO2 exhaust level of the engine, and the at least one electronic control unit is further structured to determine each of the H2 fueling command and the HC fueling command based on the monitored CO2 exhaust level of the engine.

* * * * *